(12) United States Patent
Chou

(10) Patent No.: US 11,183,865 B2
(45) Date of Patent: Nov. 23, 2021

(54) WIRELESS CHARGING MOUSEPAD STRUCTURE AND PROCESSES

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 385 days.

(21) Appl. No.: 16/276,572

(22) Filed: Feb. 14, 2019

(65) Prior Publication Data

US 2020/0220374 A1 Jul. 9, 2020

(30) Foreign Application Priority Data

Jan. 7, 2019 (TW) .................................. 108100573

(51) Int. Cl.
*H02J 50/10* (2016.01)
*H02J 7/02* (2016.01)
*G06F 3/039* (2013.01)
*H02J 50/00* (2016.01)
*H02J 7/00* (2006.01)
*G06F 3/0354* (2013.01)

(52) U.S. Cl.
CPC ............ *H02J 7/025* (2013.01); *G06F 3/0395* (2013.01); *H02J 50/005* (2020.01); *H02J 50/10* (2016.02); *G06F 3/039* (2013.01); *G06F 3/03543* (2013.01); *H02J 7/0045* (2013.01)

(58) Field of Classification Search
CPC .......... H02J 7/025; H02J 50/005; H02J 50/10; G06F 3/0395

USPC .......................................... 320/108; 307/104
See application file for complete search history.

(56) References Cited

U.S. PATENT DOCUMENTS

| 4,100,009 A | * | 7/1978 | Nakajima | ............ B01D 17/045 |
| | | | | 156/184 |
| 4,531,561 A | * | 7/1985 | Ippen | ........................ B60C 5/14 |
| | | | | 152/510 |

(Continued)

FOREIGN PATENT DOCUMENTS

| CN | 207781366 U | * | 8/2018 |
| CN | 207853538 U | | 9/2018 |
| TW | 201530579 A | | 8/2015 |

OTHER PUBLICATIONS

"Know Your Fibers: Wovens vs. Nonwovens and Knit Fabrics," BarnhardtCotton, Published Online Jan. 25, 2017, Accessed Online Mar. 5, 2021, https://barnhardtcotton.net/blog/know-fibers-wovens-vs-nonwovens-knit-fabrics/) (Year: 2017).*

(Continued)

*Primary Examiner* — John T Trischler
(74) *Attorney, Agent, or Firm* — Chun-Ming Shih; HDLS IPR Services

(57) ABSTRACT

A wireless charging mousepad structure and processes are provided. The processes include providing a bottom seat and disposing a first cloth on the bottom seat, bonding the first cloth to the bottom seat through a first glue, embedding a coil layer into the first glue, disposing a second glue on a second cloth, laminating the second glue on the coil layer, and embedding the coil layer in the first glue and the second glue by heat pressing. Thereby, the wireless charging mousepad is completed.

10 Claims, 3 Drawing Sheets

(56) References Cited

U.S. PATENT DOCUMENTS

| | | | | |
|---|---|---|---|---|
| 6,243,870 B1* | 6/2001 | Graber | G06F 1/163 | 2/69 |
| 6,265,332 B1* | 7/2001 | Yoshida | B32B 5/24 | 442/221 |
| 6,362,809 B2* | 3/2002 | Mattson | G06F 3/0395 | 248/346.01 |
| 6,522,826 B2* | 2/2003 | Gregory | G01C 19/722 | 356/450 |
| 6,947,026 B2* | 9/2005 | Mattson | G06F 3/0395 | 248/346.01 |
| 6,989,814 B1* | 1/2006 | Mattson | G06F 3/0395 | 248/346.01 |
| 7,047,349 B2* | 5/2006 | Carpenter | B64D 43/00 | 139/420 R |
| 8,314,342 B2* | 11/2012 | Ikeda | H01B 3/40 | 174/258 |
| 8,394,482 B2* | 3/2013 | Chou | B32B 27/04 | 428/71 |
| 8,626,297 B2* | 1/2014 | Jaax | H02J 7/007192 | 607/33 |
| 9,490,656 B2* | 11/2016 | Kurz | H01F 27/2871 | |
| 9,853,483 B2* | 12/2017 | Kurz | H04B 5/0037 | |
| 9,898,110 B1* | 2/2018 | Chou | G06F 3/03543 | |
| 10,014,710 B2* | 7/2018 | Cheah | H01L 25/18 | |
| 10,374,464 B2* | 8/2019 | Kurz | H04B 5/0087 | |
| 10,393,364 B2* | 8/2019 | Chou | G02B 6/0045 | |
| 10,622,828 B2* | 4/2020 | Chou | H01F 38/14 | |
| 10,852,856 B2* | 12/2020 | Chou | G06F 3/0383 | |
| 10,886,047 B2* | 1/2021 | Kurz | H04B 5/0037 | |
| 10,938,229 B2* | 3/2021 | Chou | H02J 50/10 | |
| 11,003,263 B2* | 5/2021 | Chou | H02J 50/10 | |
| 2001/0043196 A1* | 11/2001 | Mattson | G06F 3/0395 | 345/173 |
| 2002/0070642 A1* | 6/2002 | Mattson | G06F 3/0395 | 312/330.1 |
| 2002/0167673 A1* | 11/2002 | Gregory | G01C 19/722 | 356/465 |
| 2004/0039433 A1* | 2/2004 | Wodnicki | A61N 2/02 | 607/115 |
| 2004/0189246 A1* | 9/2004 | Bulai | G06F 3/0395 | 320/108 |
| 2004/0235382 A1* | 11/2004 | Groten | G06F 3/0395 | 442/199 |
| 2005/0183514 A1* | 8/2005 | Huybrechts | G01F 15/006 | 73/861.12 |
| 2007/0069097 A1* | 3/2007 | Hsieh | G06F 3/0395 | 248/346.01 |
| 2007/0139000 A1* | 6/2007 | Kozuma | H02J 7/025 | 320/108 |
| 2008/0211455 A1* | 9/2008 | Park | H02J 50/80 | 320/108 |
| 2009/0032666 A1* | 2/2009 | Kuo | G06F 3/0395 | 248/346.01 |
| 2009/0082835 A1* | 3/2009 | Jaax | H02J 7/007192 | 607/61 |
| 2010/0301501 A1* | 12/2010 | Brenner | B65H 55/043 | 264/1.24 |
| 2011/0084933 A1* | 4/2011 | Curtis | G06F 3/046 | 345/174 |
| 2011/0244168 A1* | 10/2011 | Chou | B32B 5/18 | 428/71 |
| 2014/0084860 A1* | 3/2014 | Jaax | A61N 1/3787 | 320/108 |
| 2014/0266025 A1* | 9/2014 | Jakubowski | H02J 50/10 | 320/108 |
| 2015/0145635 A1* | 5/2015 | Kurz | H01F 5/00 | 336/232 |
| 2015/0244203 A1* | 8/2015 | Kurz | H01F 27/2871 | 320/108 |
| 2016/0085322 A1* | 3/2016 | Park | G06F 1/266 | 345/163 |
| 2016/0101291 A1* | 4/2016 | Jaax | H02J 50/10 | 607/61 |
| 2016/0246265 A1* | 8/2016 | An | G05B 1/01 | |
| 2017/0170676 A1* | 6/2017 | Cheah | H01L 21/568 | |
| 2017/0296833 A1* | 10/2017 | Jaax | H02J 7/007192 | |
| 2018/0138732 A1* | 5/2018 | Kurz | H01F 5/00 | |
| 2018/0211771 A1* | 7/2018 | Kurz | H01F 27/2852 | |
| 2018/0211772 A1* | 7/2018 | Kurz | H01F 27/2847 | |
| 2018/0269561 A1* | 9/2018 | Kim | H01Q 1/085 | |
| 2018/0361165 A1* | 12/2018 | Jaax | A61N 1/3787 | |
| 2019/0305576 A1* | 10/2019 | Chou | G06F 3/0395 | |
| 2019/0363581 A1* | 11/2019 | Kurz | H01F 27/2852 | |
| 2019/0393711 A1* | 12/2019 | Chou | H02J 7/0029 | |
| 2020/0218369 A1* | 7/2020 | Chou | G06F 3/03543 | |
| 2020/0218370 A1* | 7/2020 | Lu | H02J 7/025 | |
| 2020/0225774 A1* | 7/2020 | Chou | H02J 50/10 | |
| 2021/0019005 A1* | 1/2021 | Chen | G06F 3/0445 | |
| 2021/0225584 A1* | 7/2021 | Catalano | H01F 41/02 | |

OTHER PUBLICATIONS

"Razer Mamba HyperFlux Wireless Gaming Mouse & Mouse Pad: 16,000 DPI Optical Sensor—Chroma RGB Lighting—9 Programmable Buttons—Mechanical Switches—Wireless Power Transfer", Razer on Amazon.com, Date first available for sale on Amazon.com Mar. 2, 2018, accessed Mar. 5, 2021, (Year: 2018).*

[Item V cont.] (www.amazon.com/Razer-Mamba-Hyperflux-Firefly-Bundle/dp/B07B467856/ref=sr_1_2?ascsubtag=pcg-us-8385638344097239000-20&dchild=1&geniuslink=true&keywords=Razer+Mamba+Hyperflux&qid=1614961996&sr=8-2 (Year: 2018).*

Office Action dated Jan. 8, 2020 of the corresponding Taiwan patent application.

* cited by examiner

WIRELESS CHARGING MOUSEPAD STRUCTURE AND PROCESSES

BACKGROUND OF THE INVENTION

Field of the Invention

The present invention generally relates to mousepad and, in particular to a wireless charging mousepad structure and processes.

Description of Prior Art

Generally speaking, a mousepad is usually used with a mouse to obtain an accurate mouse cursor position during the movement of the mouse. Moreover, a softer woven fabric may be adopted to be the surface of a mousepad so as to provide a comfortable and better touch for users while operating on the mousepad.

Moreover, since wireless mouse provides users with great convenience in operation, now a combination of wireless charging mousepad and wireless mouse have provided on the market. However, in the existing wireless charging mousepad structure, the wireless charging module is stacked directly on the mousepad so that the charging surface will be a bulge on the surface, thus the surface of the mouse pad is not at same level and the charging surface may become an obstacle while the mouse moving thereon.

In view of the above drawbacks, the Inventor proposes the present invention based on his expert knowledge and elaborate researches in order to solve the problems of prior art.

SUMMARY OF THE INVENTION

Accordingly, an object of the present invention is to provide a wireless charging mousepad and process thereof, in which the coil layer is embedded in the glue layer without protruding from the second cloth so as to provide a practical mousepad structure.

In order to achieve the object mentioned above, the present invention provides a wireless charging mousepad including a bottom seat, a first cloth, a glue layer, a coil layer and a second cloth. The first cloth is disposed on the bottom seat; the glue layer is disposed on the first cloth; the coil layer is disposed in the glue layer, and the second cloth disposed on the glue layer.

In order to achieve the object mentioned above, the present invention provides a wireless charging mousepad processes, including: providing a bottom seat and disposing a first cloth on the bottom seat; providing a glue layer and disposing on the first cloth; providing a coil layer and embedding the coil layer in the glue layer; and providing a second cloth and disposing the second cloth on the glue layer.

In order to achieve the object mentioned above, the present invention provides wireless charging mousepad processes, including: providing a bottom seat and disposing a first cloth on the bottom seat and bonding the first cloth layer to the bottom seat through a first glue, providing a coil layer and laminating the coil layer on the first glue to form a lower semi-finished product, providing a second cloth and disposing a second glue on the second cloth to form an upper semi-finished product, laminating the upper semi-finished product on the coil layer of the lower semi-finished product; and performing a heat press on the laminated upper semi-finished product and the lower semi-finished product so that the coil layer can be embedded in the first glue and the second glue.

Comparing to the prior art, the wireless charging mousepad of the present invention provides a bottom seat, a first cloth, a first glue, a coil layer, a second glue and a second cloth which are disposed sequentially from bottom to top, and the coil layer is embedded in the first glue and the second glue without protruding from the second cloth, thus the surface of the mousepad is flat for facilitating the movement of the mouse so as to increase the utility of the present invention.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
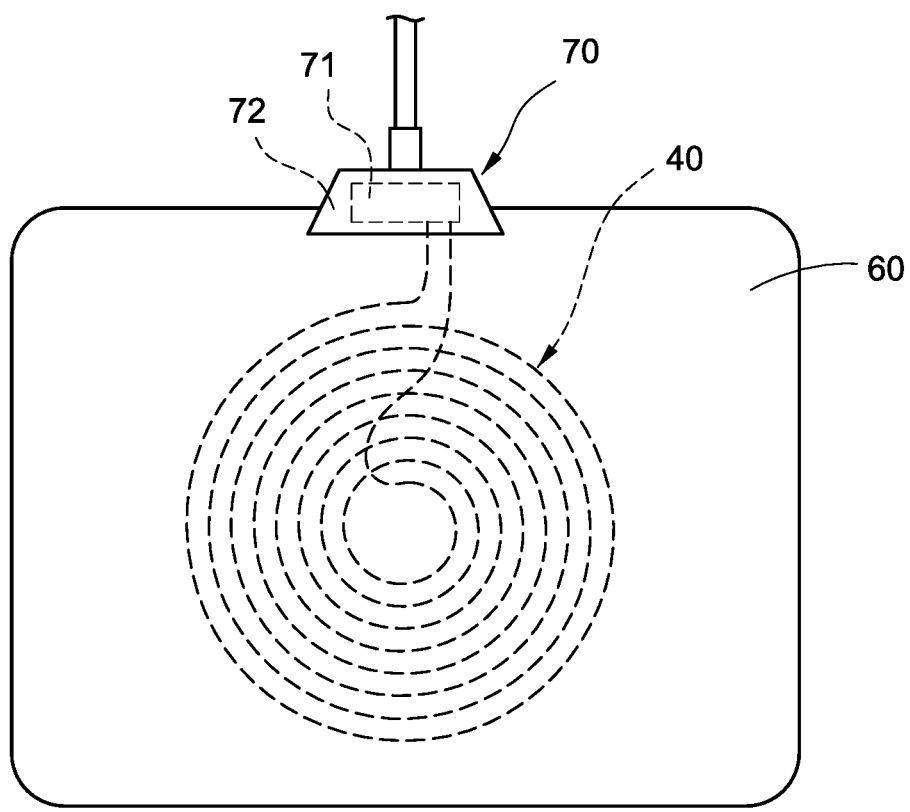
FIG. 1 is a top view of wireless charging mousepad of the present invention.
Figure 2:
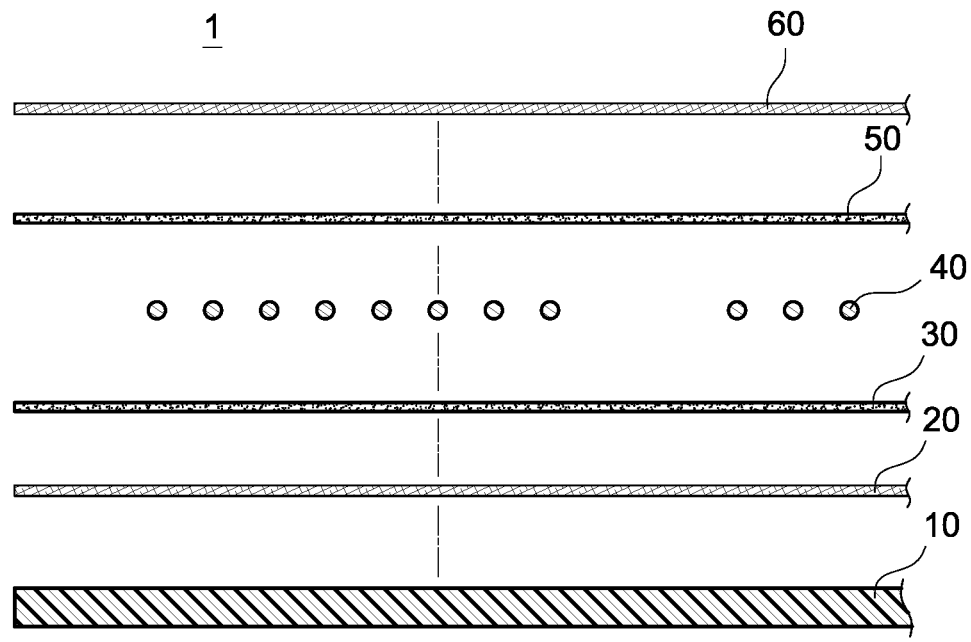
FIG. 2 is a cross sectional view of wireless charging mousepad of the present invention.

Please refer to FIG. 1 and FIG. 2, which depict a top schematic view and a cross sectional view of wireless charging mousepad of the present invention. The present invention provides a bottom seat 10, a first cloth 20, a first glue 30, a coil layer 40, a second glue 50 and a second cloth 60 which are disposed sequentially from bottom to top to form the wireless charging mousepad 1. More detail descriptions of the wireless charging mousepad 1 are as follows The bottom seat 10 is, preferably, made of rubber or plastic as the base of the wirelessly chargeable mousepad structure 1. The first cloth 20 is disposed on the bottom seat 10, and the first cloth 20 is cloth for combination. The first glue 30 is disposed on the first cloth 20 and bonded on the bottom seat 10 through the first cloth 20.

Furthermore, the coil layer 40 is disposed on the first glue 30. The coil layer 40 includes a plurality of induction coils of wireless charging. The second glue 50 is disposed on the coil layer 40, and the second cloth 60 is disposed on the second glue 50. Thereby, the coil layer 40 is embedded in the first glue 30 and the second glue 50 after heat pressing. It should be noted that the second cloth 60 is cloth for a mouse to move thereon.

Another thing to be noted is, the first glue 30 and the second glue 50 can be provided as a single thick glue layer 30', and the coil layer 40 can be embedded therein by heating the glue layer 30'.

As shown in FIG. 1, in an embodiment of the present invention, the wireless charging mousepad 1 further includes a connection module 70. The connection module 70 includes a circuit board 71 electrically connected with the coil layer 40 and a connector 72 combined with the circuit board 71. Thereby, an external power can supply power to the circuit board 71 and the coil layer 40 through the connector 72.

Specifically, the first glue is, preferably, 0.3 mm, and the second glue is, preferably, 0.4 mm. Besides, the first cloth 20 and the second cloth 60 are composed of a non-woven fabric separately.

Through the above configuration, the coil layer 40 of the wireless charging mousepad 1 of the present invention can be embedded in the first glue 30 and second the glue 50 without protruding from the second cloth 60.

Figure 3A:
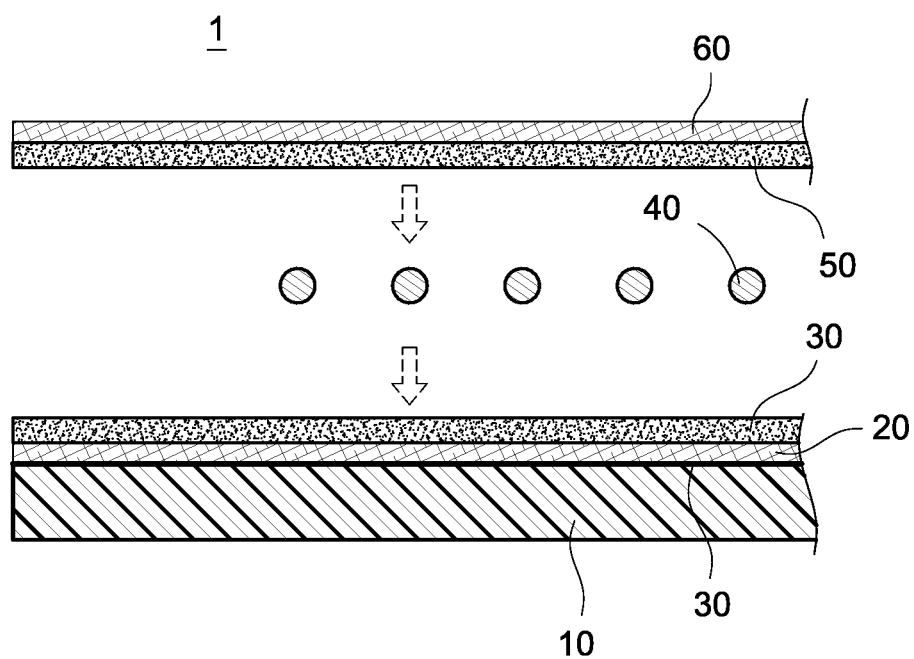
FIG. 3A and FIG. 3B are process schematic views of wireless charging mousepad of the present invention.
Figure 3B:
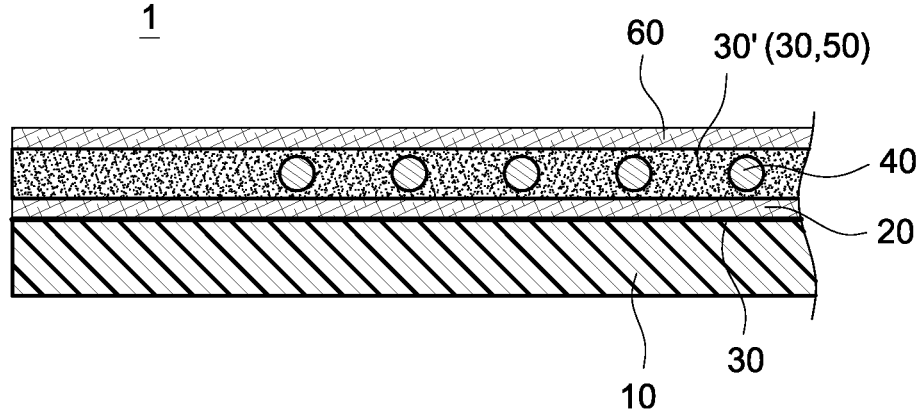

Please further refer to FIG. 3A and FIG. 3B, which depict process schematic views of wireless charging mousepad of the present invention. As shown in figures, the processes of wireless charging mousepad of the present invention are as follows. The processes include providing a bottom seat 10 and disposing a first cloth 20 on the bottom seat 10 firstly, and then the first cloth 20 is bonded to the bottom seat 10 through a first glue 30. Next, a coil layer 40 is provided to be laminated on the first glue 30 to form a lower semi-finished product.

On the other hand, the processes also include providing a second cloth 60 and disposing a second glue 50 on the second cloth 60 to form an upper semi-finished product.

And then, the upper semi-finished product is laminated with one side of the second glue 50 on the coil layer 40 of the lower semi-finished product. At last, a heat press is performed to the laminated upper semi-finished product and the lower semi-finished product so that the coil layer 40 can be placed in a fusing first glue 30 and second glue 50. Thereby, the coil layer 40 will be embedded in the first glue 30 and the second glue 50 without protruding from the second cloth 60.

It is worthy of notice that, when the first glue 30 and the second glue 50 are provided as a single thick glue layer 30', and the coil layer 40 can be embedded in the glue layer 30' by heating the glue layer 30'. Further, in real practice, the heating temperature can be adjusted depending on the condition which the coil layer 40 sinking into the glue layer 30' to make the coil layer 40 being completely embedded in the glue layer 30'.

Another thing to be noted is, in the wireless charging mousepad 1 of the present invention, when the second cloth 60 is thin, it has a fine texture is in use and a low friction. Besides, the second glue 50 is easily permeated to the second cloth 60 to destroy the surface.

Figure 4:
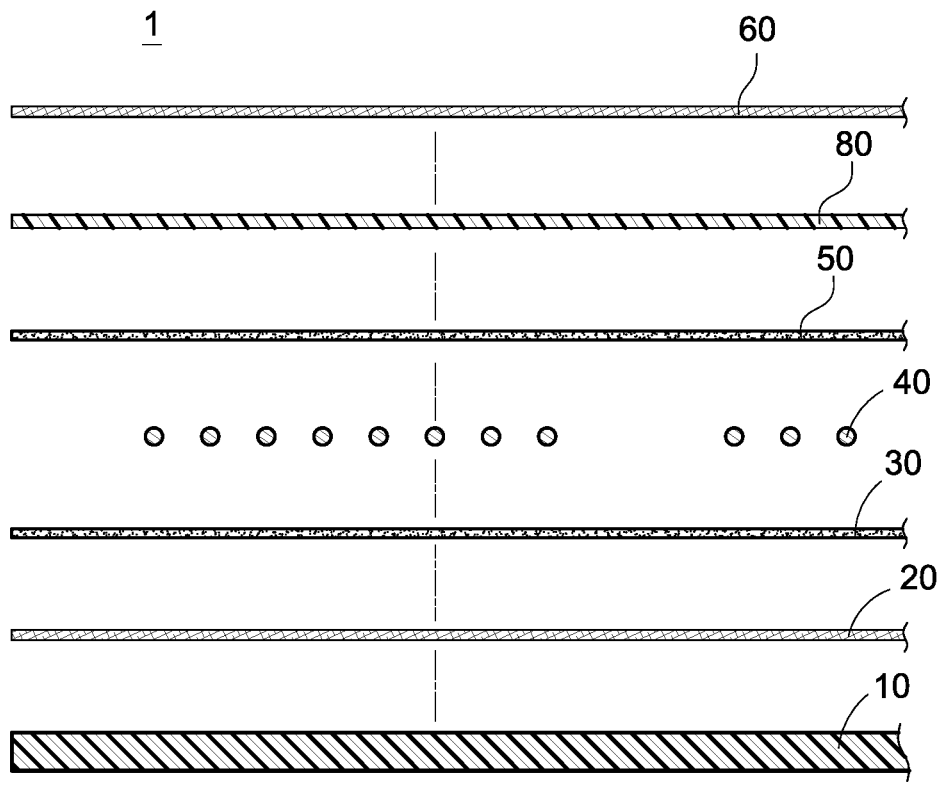
FIG. 4 is another embodiment of wireless charging mousepad of the present invention.

As shown in FIG. 4, which depict another embodiment of wireless charging mousepad of the present invention. In the above condition, the wireless charging mousepad 1 can further include an isolation layer 80, and the isolation layer 80 can be a polyurethane (PU) layer or an acryl layer. The isolation layer 80 is disposed between the second cloth 60 and the second glue 50. Furthermore, the process is to dispose the isolation layer 80 on the second cloth 60 and then to dispose the second glue 50 thereon.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A wireless charging mousepad, comprising:
   a bottom seat;
   a first cloth disposed on the bottom seat;
   a glue layer disposed on the first cloth and bonded on the bottom seat through the first cloth;
   a singular spiral coil layer entirely embedded in the glue layer; and
   a second cloth disposed above the glue layer.

2. The wireless charging mousepad according to claim 1, further including a connection module, wherein the connection module includes a circuit board electrically connected with the coil layer and a connector combined with the circuit board.

3. The wireless charging mousepad according to claim 1, wherein the first cloth and the second cloth are composed of a non-woven fabric separately.

4. The wireless charging mousepad according to claim 1, further including an isolation layer, wherein the isolation layer is disposed between the second cloth and the glue layer.

5. The wireless charging mousepad according to claim 1, wherein the glue layer includes a first glue and a second glue, the first glue is bonded on the bottom seat through the first cloth, and the coil layer is entirely embedded in the first glue and the second glue after heat pressing.

6. The wireless charging mousepad according to claim 5, wherein the first glue has a thickness of 0.3 mm, and the second glue has a thickness of 0.4 mm.

7. A wireless charging mousepad process, including:
   providing a bottom seat and disposing a first cloth on the bottom seat;
   providing a glue layer and disposing on the first cloth, wherein the glue layer is bonded on the bottom seat through the first cloth;
   providing a singular spiral coil layer and entirely embedding the coil layer in the glue layer; and
   providing a second cloth and disposing the second cloth above the glue layer.

8. The wireless charging mousepad process according to claim 7, wherein the coil layer is entirely embedded in the glue layer by heating the glue layer.

9. A wireless charging mousepad process, including:
   providing a bottom seat and disposing a first cloth on the bottom seat;
   providing a first glue disposed on the first cloth, wherein the glue layer is bonded on the bottom seat through the first cloth;
   providing a singular spiral coil layer and laminating the coil layer on the first glue to form a lower semi-finished product;
   providing a second cloth and disposing a second glue on the second cloth to form an upper semi-finished product;
   laminating the upper semi-finished product on the coil layer of the lower semi-finished product; and
   performing a heat press on the laminated upper semi-finished product and lower semi-finished product so that the coil layer is entirely embedded in the first glue and the second glue.

10. The wireless charging mousepad process according to claim 9, further including process of providing an isolation layer, wherein the isolation layer is disposed on the second cloth firstly and then the second glue is disposed thereon.

* * * * *